United States Patent [19]

Schnyder

[11] Patent Number: 4,480,452

[45] Date of Patent: Nov. 6, 1984

[54] ROLLING MILL

[75] Inventor: Eugen Schnyder, Ottenbach, Switzerland

[73] Assignee: Sulzer-Escher Wyss Limited, Zürich, Switzerland

[21] Appl. No.: 476,995

[22] Filed: Mar. 21, 1983

[30] Foreign Application Priority Data

Apr. 8, 1982 [CH] Switzerland ............... 2188/82

[51] Int. Cl.³ .............. B21B 13/14; B21B 37/02; B21B 37/08
[52] U.S. Cl. ................ 72/16; 29/113 AD; 29/116 AD; 72/21; 72/243; 72/245; 100/47; 100/162 B; 100/170
[58] Field of Search ........... 72/243, 241, 245, 16, 72/21; 29/113 AD, 116 AD; 100/162 B, 170, 47

[56] References Cited

U.S. PATENT DOCUMENTS 3,731,508  5/1973  Sabatini et al. ............ 72/16 X
4,299,162  11/1981  Hartmann et al. ......... 100/162 B X
4,319,389  3/1982  Marchioro ................. 72/245 X Primary Examiner—Francis S. Husar
Assistant Examiner—Steven B. Katz
Attorney, Agent, or Firm—Werner W. Kleeman

[57] ABSTRACT

In a rolling mill containing two work rolls and, as desired, supporting or back-up rolls, a rapid adjustment of the roll gap or nip with elimination of effects due to elastic elongation of the roll framework or stand is achieved in that when structuring at least one of the rolls as a controlled deflection roll containing a stationary roll support and a rotatable roll shell rotating thereabout, there is measured the position of the inner side or surface of the roll shell and an automatic control serves to adjust or readjust the roll gap or nip by causing changes in the pressure exerted upon the hydrostatic supporting or pressure elements placed intermediate the stationary roll support and the rotatable roll shell.

18 Claims, 6 Drawing Figures

ROLLING MILL

BACKGROUND OF THE INVENTION

The present invention broadly relates to a new and improved construction of rolling or roller mill.

In its more specific aspects the invention relates to a new and improved construction of rolling mill for rolling web-like materials, the rolling mill comprising a roll framework or stand at which there are arranged two work rolls forming a roll gap or nip therebetween acting upon the web-like material in a pressing plane and possibly also having arranged back-up or supporting rolls at the roll stand. At least one of the rolls is designed as a controlled deflection roll including a stationary roll support or beam supported at the roll stand and a rotatable roll shell rotatable about the roll support. The roll shell is supported at the stationary roll by means of support or pressure elements supplied with a pressure fluid or pressurized fluid medium and is displaceable in the pressing plane. An automatic control or regulation device serves to controllably adjust a predetermined thickness of the web-like material subjected to the rolling operation.

Rolling mills as known, for example, from U.S. Pat. No. 4,222,255, granted Sept. 16, 1980, serve to roll metal bands, plastic foils or other plastically deformable materials to a predetermined material thickness. In the most simple case, the rolling mill comprises two work rolls. Additionally, supporting or back-up rolls can be provided in the pressing plane, for example, two supporting or back-up rolls in a so-called four high roll-roller stand, or further supporting or back-up rolls may be arranged in the pressing plane or laterally thereof. It has been found to be very advantageous to design the work rolls or one or a number of the supporting or back-up rolls as controlled deflection rolls in order to exert a defined and adjustable pressure upon the rolled web of material.

A problem in rolling mills of the aforementioned type is the maintenance of a predetermined thickness of the rolled web material. Usually the thickness control, as described, for example, in U.S. Pat. No. 4,074,624, granted Feb. 21, 1978, is performed by sensing the thickness of the web material after the web material has left the roll nip or gap by using a thickness sensor, in order to control and adjust an automatic control or regulator for controlling the pressure of the pressurized fluid medium acting upon the hydrostatic support or pressure elements of the controlled deflection roll such that the material thickness is maintained constant. A disadvantage of this technique is that the thickness sensing or scanning operation has to be accomplished at a certain distance from the roll nip or gap, and thus, with some time-delay. In rapidly running rolling mills the automatic control, therefore, is not rapid enough and there will occur thickness fluctuations, or it will be impossible to increase the rolling speed beyond a predetermined value.

It has been attempted to avoid this disadvantage by controlling the roll nip or gap without any time-delay by using an indirect measurement at measuring points or sites located in the roll framework or stand. Such indirect measurement may be accomplished for example, by measuring the position of positioning or adjustment cylinders for the supporting rolls or the bearing journals thereof as described, for example, in German Pat. No. 2,439,580, granted Jan. 12, 1978, or by performing measurements at the bearing bushings of the roll shell as described in British Pat. No. 2,068,482, published Aug. 12, 1981. It is a disadvantage of these techniques that elastic deformations of the rolls, the bearing journals and the roll stand as well as concentricity or out-of-true running errors in the bearings enter into the measurement and falsify the measuring result. Even the direct measurement of the distance between the supporting rolls, while avoiding the roll stand elongations, still includes the elastic portions of the roll deformation.

While a direct measurement of the distance between the work rolls as described, for example, in British Pat. No. 1,529,861, published Oct. 25, 1978, will render a measurement which is closest to the actual process, such measurement again has the shortcoming that the sensors or feelers are subjected to all sorts of environmental effects like, for example, contamination by metal pieces or spangles, oil used in the rolling process, contaminants or dirt, as well as the action of temperature. Moreover, considering the frequently required change in the work rolls there prevails the danger of damage to the sensors.

SUMMARY OF THE INVENTION

Therefore, with the foregoing in mind it is a primary object of the present invention to provide a new and improved construction of rolling mill in which the thickness of the rolled material or stock can be measured without any or at least any appreciable time-delay and with extensive exclusion of elastic deformations in the roll stand or framework.

Another important object of the present invention is directed to the provision of a new and improved construction of rolling mill in which the thickness of the rolled material or stock can be measured reliably, rapidly and safe from environmental effects.

Still a further significant object of the present invention is directed to a new and improved construction of rolling mill in which the thickness of the rolled material or stock is controlled by an automatic control, the components or parts of which are not subject to the danger of being damaged.

Another noteworthy object of the present invention is directed to a new and improved design of rolling mill in which the measurement of the thickness of the rolled material or stock is not associated with the aforementioned limitations and drawbacks of the prior art rolling mills.

Now in order to implement these and still further objects of the invention, which will become more readily apparent as the description proceeds, the rolling mill of the present development is manifested by the features that, at least one position transmitter is provided for measuring the position of the inner or interior side of the roll shell facing the roll support in the pressing plane and on the side facing the roll nip or gap relative to a base or reference member connected to the roll framework or stand. The output signal of the position transmitter acts upon the automatic control for controlling the pressure of the pressurized fluid medium effective at the support or pressure elements such that the roll shell assumes a predetermined position.

By designing one supporting or back-up roll as a controlled deflection roll or roller it is possible to locate the measuring point for the position measurement as closely as possible to the work roll and to the roll nip or gap, while environmental effects are avoided and while excluding the elastic deformation of the roll framework or stand. Since the measurement is accomplished directly at the roll shell of the supporting or back-up roll which is in direct contact with the work roll, the deformation of the roll support or beam of this supporting or back-up roll is also eliminated. The same advantage is achieved when one work roll is designed as a controlled deflection roll.

It is advantageous to use a part of the mounting element for the roll support of the supporting or back-up roll as a base or reference member for measuring the position of the roll shell.

Also, it is beneficial to provide a respective position transmitter at each of the two sides or end portions of the controlled deflection roll and to design the automatic control regulator such that the two position transmitters individually control a number of zones formed by the support or pressure elements.

Advantageously, also both work rolls or supporting or back-up rolls can be designed as controlled deflection rolls containing operatively associated position transmitters. In such an arrangement the position transmitters of the two controlled deflection rolls can be related to a common base or reference member as, for example, the roll support-mounting element of one of the rolls. However, instead of this arrangement the two position transmitters may be completely disengaged from the roll support-mounting elements and may be fixed with respect to a post or upright of the roller stand or framework. An intermediate member of the post or upright, in that case, serves to provide a mechanical connection.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
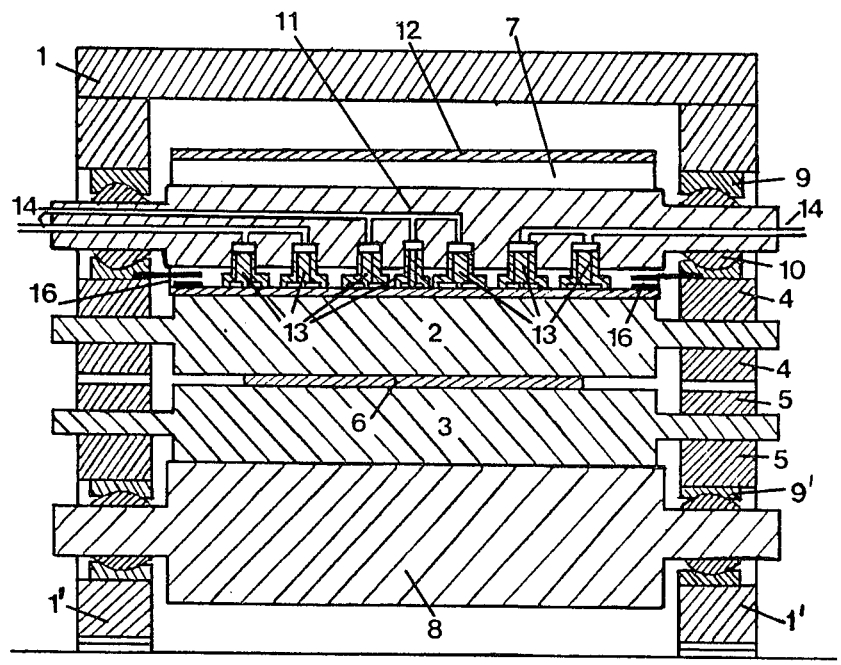
FIG. 1 shows a section in the pressing plane of a rolling mill constructed according to the present invention.
Figure 2:
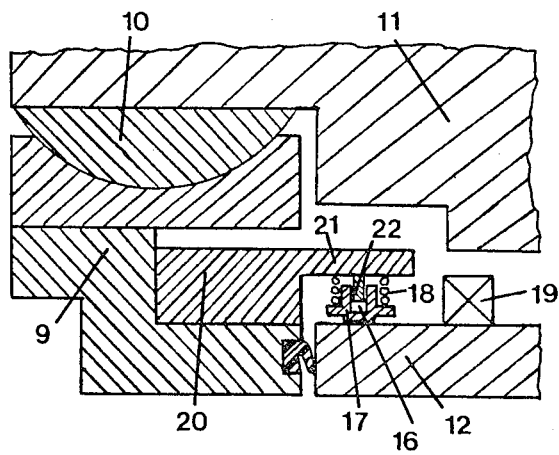
FIG. 2 is an enlarged sectional detail showing the position transmitter and the arrangement thereof in the rolling mill shown in FIG. 1.

Describing now the drawings, it is to be understood that only enough of the construction of the exemplary embodiments of rolling mill has been shown as needed for those skilled in the art to readily understand the underlying principles and concepts of the present development, while simplifying the showing of the drawings. Turning attention now specifically to FIGS. 1 to 3, there has been schematically shown in sectional view a rolling mill comprising a roll framework or stand 1 containing uprights or stand posts 1' in which two work rolls 2 and 3 are rotatably journalled by means of any suitable roll support-mounting elements 4 and 5, respectively. A roll nip or gap 6 is formed between the coacting work rolls 2 and 3. During the rolling operation the work rolls 2 and 3 are pressed or urged towards each other by the respective supporting or back-up rolls 7 and 8 arranged on both sides thereof in a pressing plane A, these supporting or back-up rolls again being journalled in the roll stand 1 by means of suitable roll support-mounting elements 9 and 9', respectively.

The supporting or back-up roll 7 is here shown designed as a controlled deflection roll. It comprises a stationary roll support or beam 11 which is journalled at its opposite ends in a respective spherical bearing 10 or the like in the related roll support-mounting element 9 and further comprises a rotatable roll shell 12 appropriately mounted to be rotatable about the stationary roll support 11. The roll shell 12 is supported at the stationary roll support 11 by means of hydrostatic support or pressure elements 13 to which a suitable pressurized fluid medium, typically oil, is supplied via conduits or lines 14. By means of the pressure exerted by the pressurized fluid medium the roll shell 12 is pressed against the work roll 2 in the pressing plane A. The hydrostatic support or pressure elements 13 may be constructed as, for example, described in U.S. Pat. No. 3,802,044 and comprise respective cylinders and plunger-like support pistons movable therein and provided with pressure or bearing pockets flow communicating with the related cylinder or cylinder chamber. However, different designs of hydrostatic support or pressure elements also can be used, particularly simpler designs according to which the support or pressure elements comprise one or a number of pressure chambers arranged between the roll support and the roll shell in the absence of any movable plungers or punches.

Figure 6:
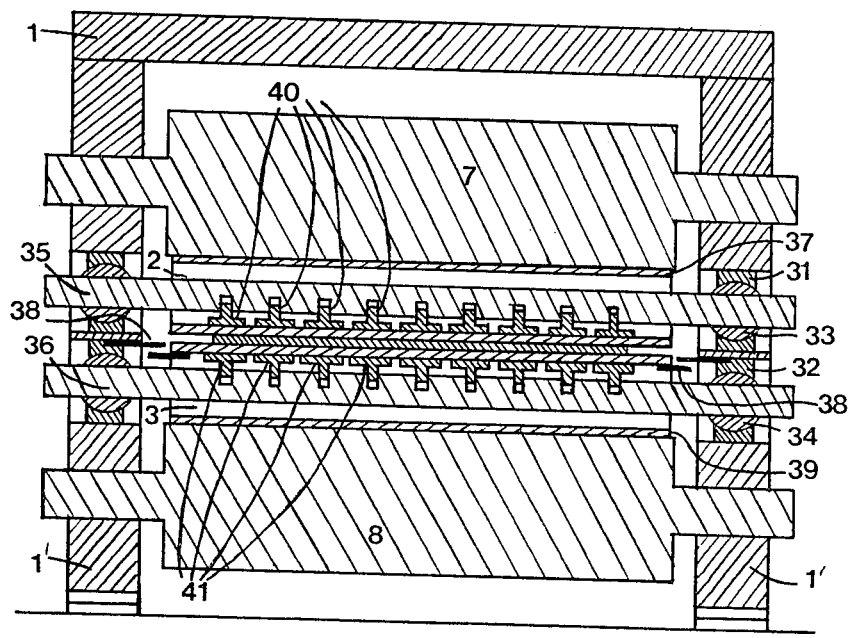
FIG. 6 is a sectional view, analogous to the showing of FIG. 1, but depicting a modified construction of rolling mill.

The other supporting or back-up roll 8 may be designed as a conventional solid metal roll; also, the supporting or back-up roll 8 may comprise a controlled deflection roll containing a rotatable roll shell 15 and designed analogous to the upper supporting or back-up roll 7. Instead of the supporting or back-up rolls 7, 8 being constituted by controlled deflection rolls the work rolls 2, 3 may be designed as controlled deflection rolls as will be explained more fully hereinafter with reference to FIG. 6.

Automatic control of the width of the roll nip or gap 6, and thus, the thickness of the rolled web material is effected by at least one position transmitter 16 which measures the position of the inner side or surface of the roll shell 12 facing the stationary roll support or beam 11. It is advantageous to provide a respective position transmitter 16 at the two outer or exterior marginal regions or ends of the roll shell 12 which are connected to an automatic control, like the control or control means 27, 28, shown in FIG. 5. Using the position of the inner side or surface of the roll shell 12 as the controlled variable or parameter has the advantage that neither elastic elongations or expansions of the roller stand or framework and of the roll support-mounting elements 9 nor the deflection of the supporting or back-up rolls 7, 8 enter into the measuring result, only the relatively small and nearly negligible flattening of the work rolls 2, 3. On the other hand, the position transmitter 16 is protected from environmental effects occurring during the rolling operation. Furthermore, there is no danger of damage when the work rolls 2, 3 are exchanged.

In principle any suitable displacement pick-up or transducer may be used as the position transmitter 16 as, for example, transmitters of the type carrying out a contactless measuring operation. The design and arrangement of a suitable, inductively operating distance measuring device or position transmitter 16 is shown in detail in FIG. 2. The position transmitter 16 comprises a mounting piece or element 20 connected to the related roll support-mounting element 9 and having an extension 21 carrying the actual inductively operating measuring transmitter or transducer 22. A sleeve-shaped counter part or element 17 thereof is urged against a smooth running surface formed at the inner side or surface of the roll shell 12 by means of a helical spring 18 or equivalent structure arranged adjacent the bearing 19. In this arrangement the distance of the measuring transmitter 22 from the counter part or element 17 is measured and a corresponding output signal is supplied to the automatic control or regulator.

Figure 3:
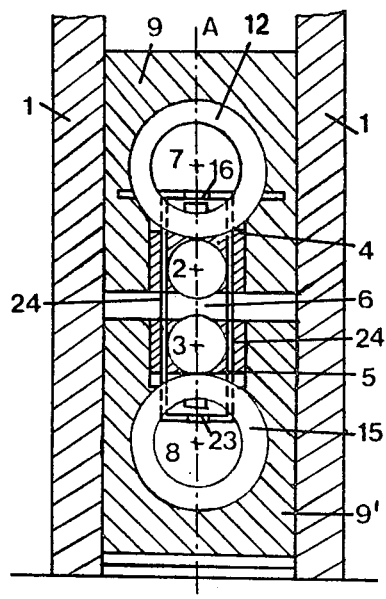
FIG. 3 is a sectional view taken perpendicular with respect to the pressing plane through the rolling mill shown in FIG. 1.

In the embodiment shown in FIG. 3 both the supporting or back-up rolls 7 and 8 are designed as controlled deflection rolls and a respective position transmitter 16 and 23 is provided at the roll shells 12 and 15, respectively, of these two supporting or back-up rolls 7 and 8, respectively. While the position transmitter 16 of the top roll or roller 7 again uses the associated roll support-mounting element 9 as a base or reference member, the position transmitter 23 of the bottom supporting or back-up roll 8 is isolated from the associated roll support-mounting element 9' and instead is supported at the same base or reference member as the top position transmitter 16 by means of a suitable mechanical connection 24. Thus, deformations of the roll support-mounting elements 9, 9' are eliminated.

Figure 4:
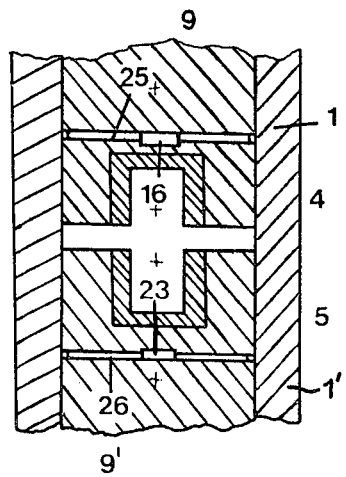
FIG. 4 is a section through part of a modified construction of rolling mill including a modified position transmitter arrangement.

In the embodiment shown in FIG. 4 the effect of the roll support-mounting elements 9, 9' is eliminated by mechanically or hydraulically clamping the two position transmitters 16 and 23 to the uprights or posts 1' of the roll stand 1 by means of clamping devices 25 and 26, respectively. An intermediate member or portion of the roll stand 1 which is located between the clamping devices 25 and 26 serves to provide the mechanical connection and the transfer of the actual position value. Since the roll stand deformation between these two points is quite small the measuring result is only slightly affected by deformations. Eventually, such deformations may be readily compensated for by correction computations. Also, one position transmitter may be clamped to the roll stand while the other, as shown for the arrangement of FIG. 3, is supported at this position transmitter by a mechanical connection.

Figure 5:
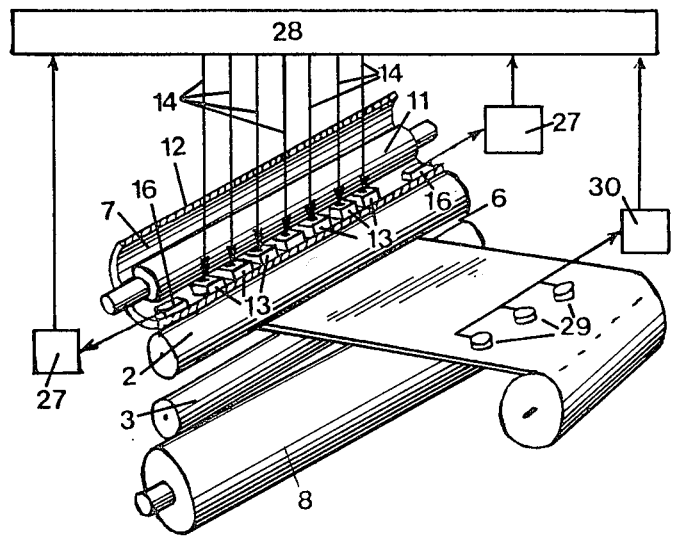
FIG. 5 is a schematic illustration of the rolling mill shown in FIG. 1 including the associated control device or means.

FIG. 5 is a schematic illustration of the rolling mill in combination with an automatic control. Components or parts thereof which are analogous to or identical with components or parts of the rolling mill embodiments described hereinbefore have been generally conveniently designated by the same reference numerals.

In the embodiment shown in FIG. 5, the two position transmitters 16 activate two position controls or control means 27 which transmit an adjusting or control signal to an automatic pressure regulator or control 28. Consequently, the pressure in the pressure fluid conduits or lines 14 for supplying the pressurized fluid medium to the hydrostatic support or pressure elements 13 is controlled in such a manner that the set or reference value of the position of the roll shell 12 is reliably adjusted. The control and regulation means required for this purpose are well known in the art and are presently used in rolling mills, the activation thereof occurring in conventional manner as known.

In addition to the very rapidly operating automatic control or regulation as described hereinbefore, an automatic thickness control of known construction may be provided at the material exit or departure location by using additional thickness sensors or feelers 29. These additional thickness sensors 29 may either activate the same automatic pressure control or regulator 28 via a roll gap control 30, or independently thereof may control the positioning or adjusting force by means of which the rolls are pressed against each other or, respectively, supply the predetermined set or reference value for the position of the roll shell. In this way an even more precise regulation and maintenance of the thickness of the processed material web is achieved.

In applications in which a certain thickness profile is required across the width of the web, a number of thickness sensors 29 or the like may be provided which are distributed across the width of the web and serve to individually activate individual support or pressure elements 13. Alternatively, a single thickness sensor may be provided which reciprocates or otherwise appropriately moves across the width of the web, and thus, registers the material thickness.

In the modified construction of rolling mill depicted in FIG. 6 there will again be observed a roll framework or stand 1 containing uprights or stand posts 1' in which there are rotatably journaled two work rolls 2 and 3 and two supporting or back-up rolls 7 and 8. In contrast to the previously described embodiment of FIG. 1 in this case both of the supporting or back-up rolls 7 and 8 are structured as solid rolls which are rotatably mounted in the framework or stand 1, whereas both of the work rolls 2 and 3 are constructed as controlled deflection rolls. Analogous to the structure of the controlled deflection rolls of the arrangement of FIG. 1, here also the controlled deflection rolls, defining the work rolls 2 and 3, are each respectively provided with a roll shell 37 and 39 rotatable about a stationary roll support or beam 35 and 36, respectively. These stationary roll supports or beams 35 and 36 are mounted in respective spherical bearings 33 and 34 arranged in related roll support-mounting elements 31 and 32 supported in the stand posts 1'. Both of the roll shells 37 and 39 are supported by a series of hydrostatic support or pressure elements 40 and 41, respectively, upon their related stationary roll support or beam 35 and 36, respectively, and such hydrostatic support or pressure elements 40 and 41 may be constructed in the manner described in the aforementioned U.S. Pat. No. 3,802,044. In order to be able to regulate the size of the roll gap or nip a respective position transmitter 38 is provided by both outer edges of the roll shell 39 of the one work roll 3 and which measures the position of the inner surface of the roll shell 39 which confronts the stationary roll support or beam 36. The position transmitters 38 and the therewith operatively connected control or control means can be constructed analogous to the elements previously described and shown with regard to the embodiments of FIGS. 2 to 5.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A rolling mill for rolling web-like materials, comprising:
 a roll stand;
 two work rolls mounted in said roll stand;
 two supporting rolls cooperating with said work rolls and mounted in said roll stand;
 said two work rolls forming a roll nip therebetween and defining a pressing plane in which said work rolls act upon said material;
 at least one of said rolls being structured as a controlled deflection roll comprising a stationary roll support supported in said roll stand and a rotatable roll shell rotatable about said stationary roll support;
 said rotatable roll shell having an inner surface facing said stationary roll support and two opposite end portions and being displaceable in said pressing plane;
 hydrostatic support elements acted upon by a pressurized fluid medium and supporting said rotatable roll shell at said stationary roll support;
 a reference member connected with said roll stand;
 at least one position transmitter for generating an output signal and serving to directly measure the position of said inner surface of said roll shell in said pressing plane at a side thereof facing said roll nip relative to said reference member;
 control means responsive to said output signal of said position transmitter for adjusting said hydrostatic support elements and in turn a predetermined thickness of said web-like material being processed in said roll nip between said work rolls;
 whereby said output signal of said position transmitter influences the pressure of the pressurized fluid medium acting upon said hydrostatic support elements by means of said control means such that said rotatable roll shell assumes a predetermined position.

2. The rolling mill as defined in claim 1, wherein:
 said position transmitter is arranged at one of said two opposite end portions of said rotatable roll shell.

3. The rolling mill as defined in claim 1, wherein:
 a respective position transmitter is arranged at each one of said opposite end portions of said rotatable roll shell.

4. The rolling mill as defined in claim 1, wherein:
 each of said work rolls is structured as a controlled deflection roll.

5. The rolling mill as defined in claim 1, wherein:
 a respective one of said supporting rolls is operatively associated with each one of said two work rolls;
 each said supporting roll being structured as a controlled deflection roll; and
 a respective position transmitter provided for each of said supporting rolls.

6. The rolling mill as defined in claim 1, further including:
 a roll support-mounting element provided for said roll stand for rotatably journalling said rotatable roll support and defining said reference member; and
 said position transmitter measuring the position of said inner surface of said roll shell relative to a defined location on said roll support-mounting element.

7. The rolling mill as defined in claim 5, further including:
 roll support-mounting elements in said roll stand for rotatably journalling said rotatable roll supports; and
 at least one of said position transmitters measuring the position of the inner surface of at least one of said rotatable roll shells relative to a defined location on at least one of said roll support-mounting elements and defining said reference member.

8. The rolling mill as defined in claim 1, further including:
 a roll support-mounting element provided for the roll stand for rotatably journalling said rotatable roll support; and
 said at least one position transmitter serving to measure the position of the inner surface of said rotatable roll shell directly relative to said roll stand without reference to said roll support-mounting element.

9. The rolling mill as defined in claim 8, wherein:
 said at least one position transmitter is mechanically braced at said roll stand.

10. The rolling mill as defined in claim 8, wherein:
 said at least one position transmitter is hydraulically braced at said roll stand.

11. The rolling mill as defined in claim 7, further including:
 means for mechanically interconnecting said two position transmitters so as to measure the position of the inner surfaces of said rotatable roll shells relative to said reference member which is a common reference member for both said rotatable roll shells.

12. The rolling mill as defined in claim 1, wherein:
 said position transmitter comprises an inductive distance measuring device.

13. The rolling mill as defined in claim 12, further including:
 a running surface formed at said inner surface of said rotatable roll shell;
 a counterpart operatively associated with said inductive distance measuring device and urged into contact with said running surface; and
 said inductive distance measuring device serving to measure the distance to said counterpart.

14. The rolling mill as defined in claim 1, further including:
 at least one thickness measuring transmitter for measuring the thickness of said web-like material after having left said roll nip and generating an output signal responsive thereto; and
 said output signal of said thickness measuring transmitter additionally acting upon said control means.

15. The rolling mill as defined in claim 14, wherein:
 a number of said thickness measuring transmitters are arranged along the width of said web-like material in order to maintain a predetermined thickness profile thereof by controlling the pressure of the pressurized fluid medium effective at individual ones of the hydrostatic support elements by means of said control means.

16. The rolling mill as defined in claim 1, wherein:
 said hydrostatic support elements each comprise a cylinder supplied with the pressurized fluid medium and a support piston displaceable therein; and said support piston being provided with pressure pockets communicating with its related cylinder by means of bores provided for such support piston.

17. A rolling mill for rolling web-like materials, comprising:

a roll stand;

two work rolls mounted in said roll stand;

said two work rolls forming a roll nip therebetween and defining a pressing plane in which said work rolls act upon said material;

at least one of said two work rolls being structured as a controlled deflection roll comprising a stationary roll support supported in said roll stand and a rotatable roll shell rotatable about said stationary roll support;

said rotatable roll shell having an inner surface facing said stationary roll support and two opposite end portions and being displaceable in said pressing plane;

hydrostatic support elements acted upon by a pressurized fluid medium and supporting said rotatable roll shell at said stationary roll support;

a reference member connected with said roll stand;

at least one position transmitter for generating an output signal and serving to directly measure the position of said inner surface of said roll shell in said pressing plane at a side thereof facing said roll nip relative to said reference member;

control means responsive to said output signal of said position transmitter for adjusting said hydrostatic support elements and in turn a predetermined thickness of said web-like material processed in said roll nip between said work rolls;

whereby said output signal of said position transmitter influences the pressure of the pressurized fluid medium acting upon said hydrostatic support elements by means of said control means such that said rotatable roll shell assumes a predetermined position.

18. The rolling mill as defined in claim 17, further including:

supporting rolls cooperating with said work rolls and mounted in said roll stand.

* * * * *